(12) United States Patent
Stöckel et al.

(10) Patent No.: US 8,053,147 B2
(45) Date of Patent: *Nov. 8, 2011

(54) ADVANTAGEOUS RECORDING MEDIA FOR HOLOGRAPHIC APPLICATIONS

(75) Inventors: Nicolas Stöckel, Köln (DE); Friedrich-Karl Bruder, Krefeld (DE); Fredric R. Askham, Loveland, CO (US); Michael Cole, Longmont, CO (US); Lisa Dhar, Champaign, IL (US); Mark D. Michaels, Boulder, CO (US); Sam Miller, Longmont, CO (US); Sean Quirin, Longmont, CO (US); Songvit Setthachayanon, Longmont, CO (US); Timothy J. Trentler, Boulder, CO (US); Marianela T. Lemon, Parker, CO (US)

(73) Assignees: Bayer MaterialScience AG, Leverkusen (DE); InPhase Technologies, Longmont, CO (US)

( * ) Notice: Subject to any disclaimer, the term of this patent is extended or adjusted under 35 U.S.C. 154(b) by 796 days.

This patent is subject to a terminal disclaimer.

(21) Appl. No.: 12/099,967

(22) Filed: Apr. 9, 2008

(65) Prior Publication Data

US 2009/0185470 A1 Jul. 23, 2009

Related U.S. Application Data

(60) Provisional application No. 60/907,629, filed on Apr. 11, 2007.

(51) Int. Cl.
*G03H 1/02* (2006.01)
(52) U.S. Cl. .......... 430/1; 430/2; 430/281.1; 430/280.1; 359/3
(58) Field of Classification Search .............. None
See application file for complete search history.

(56) References Cited

U.S. PATENT DOCUMENTS

| | | | |
|---|---|---|---|
| 2003/0044690 A1* | 3/2003 | Rotto | 430/1 |
| 2003/0083395 A1* | 5/2003 | Trentler et al. | 522/38 |
| 2003/0087104 A1* | 5/2003 | Dhar et al. | 428/422.8 |
| 2003/0096172 A1* | 5/2003 | Ichihashi et al. | 430/1 |
| 2004/0067323 A1* | 4/2004 | Clabburn et al. | 428/1.26 |
| 2004/0096776 A1* | 5/2004 | Tanigawa et al. | 430/281.1 |
| 2004/0219457 A1* | 11/2004 | Clabburn et al. | 430/280.1 |
| 2004/0242720 A1* | 12/2004 | Chisholm et al. | 522/49 |
| 2005/0058911 A1 | 3/2005 | Takeyama | |
| 2005/0214682 A1* | 9/2005 | Edwards et al. | 430/270.12 |
| 2007/0166625 A1* | 7/2007 | Cole et al. | 430/1 |
| 2007/0248890 A1* | 10/2007 | Cole et al. | 430/1 |
| 2008/0311482 A1* | 12/2008 | Stockel et al. | 430/2 |
| 2008/0311483 A1* | 12/2008 | Stockel et al. | 430/2 |
| 2008/0312403 A1* | 12/2008 | Stockel et al. | 528/59 |
| 2009/0062419 A1* | 3/2009 | Stockel et al. | 522/109 |

FOREIGN PATENT DOCUMENTS

| | | | |
|---|---|---|---|
| JP | 07-261643 | * | 10/1995 |
| WO | WO-2006018405 | | 2/2006 |

OTHER PUBLICATIONS

Smothers et al., "Photopolymers for holography", *Proc. SPIE*, vol. 1212, 20 (1990), Abstract only.

* cited by examiner

*Primary Examiner* — Martin Angebranndt
(74) *Attorney, Agent, or Firm* — Connolly Bove Lodge & Hutz LLP

(57) ABSTRACT

High performance media suitable for recording with a blue laser is disclosed. The blue-sensitized holographic media provides greater dynamic range and higher sensitivity than previously disclosed blue-sensitized holographic media. These media can be used for diverse applications such as data storage where the articles provide denser data storage and more rapid hologram writing times or for optical waveguides where the articles provide greater optical confinement and more rapid manufacturing times.

22 Claims, 1 Drawing Sheet

ADVANTAGEOUS RECORDING MEDIA FOR HOLOGRAPHIC APPLICATIONS

CROSS-REFERENCE TO RELATED APPLICATIONS

Figure 1:
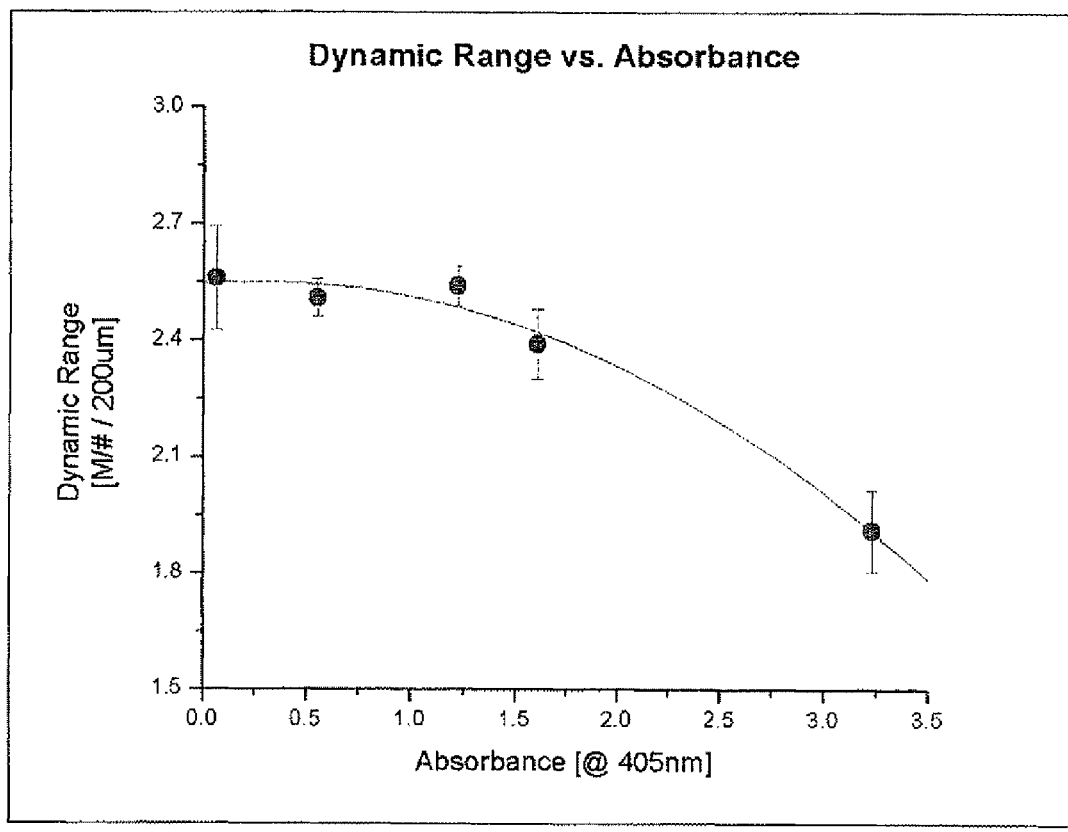

This application makes reference to and claims the priority date of co-pending U.S. Provisional Patent Application No. 60/907,629, entitled "Media for Recording with Blue Laser Diodes" filed Apr. 11, 2007. The entire disclosure and contents of the above application is hereby incorporated by reference.

BACKGROUND

1. Field of the Invention

The present invention relates generally to high performance photopolymerizable recording materials for use in holography and other related fields. The present invention also relates generally to articles comprising such photopolymerizable materials. The present invention further relates generally to recording holograms with such articles.

2. Related Art

Developers of information storage devices and methods continue to seek increased storage capacity. As part of this development, holographic memory systems have been suggested as alternatives to conventional memory devices. Holographic memory systems may be designed to record data as one bit of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimension array commonly referred to as a "page-wise" memory system. Page-wise memory systems may involve the storage and readout of an entire two-dimensional representation, e.g., a page of data. Typically, recording light passes through a two-dimensional array of low and high transparency areas representing data, and the system stores, in three dimensions, the pages of data holographically as patterns of varying refractive index imprinted into a storage medium. See Psaltis et al., "Holographic Memories," *Scientific American*, November 1995, where holographic systems are discussed generally, including page-wise memory systems.

In a holographic data storage system, information is recorded by making changes to the physical (e.g., optical) and chemical characteristics of the holographic storage medium. These changes in the holographic medium take place in response to the local intensity of the recording light. That intensity is modulated by the interference between a data-bearing beam (the data beam) and a non-data-bearing beam (the reference beam). The pattern created by the interference of the data beam and the reference beam forms a hologram which may then be recorded in the holographic medium. If the data-bearing beam is encoded by passing the data beam through, for example, a spatial light modulator (SLM), the hologram(s) may be recorded in the holographic medium as an array of light and dark squares or pixels. The holographic medium or at least the recorded portion thereof with these arrays of light and dark pixels may be subsequently illuminated with a reference beam (sometimes referred to as a reconstruction beam) of the same or similar wavelength, phase, etc., so that the recorded data may be read.

One type of holographic storage medium used recently for such holographic data storage systems are photosensitive polymer films. Photosensitive polymer films are considered attractive recording media candidates for high density holographic data storage. These films have a relatively low cost, are easily processed and can be designed to have large index contrasts with high photosensitivity. These films may also be fabricated with the dynamic range, media thickness, optical quality and dimensional stability required for high density applications. See, e.g., L. Dhar et al., "Recording Media That Exhibit High Dynamic Range for Holographic Storage," *Optics Letters*, 24, (1999): pp. 487 et. seq; Smothers et al., "Photopolymers for Holography," *SPIE OE/Laser Conference*, (Los Angeles, Calif. 1990), pp.: 1212-03.

The holographic storage media described in Smothers et al., supra contain a photoimageable system containing a liquid monomer material (the photoactive monomer) and a photoinitiator (which promotes the polymerization of the monomer upon exposure to light), where the photoimageable system is in an organic polymer host matrix that is substantially inert to the exposure light. During writing (recording) of data into the holographic medium, the monomer polymerizes in the exposed regions. Due to the lowering of the monomer concentration caused by the polymerization, monomer from the dark, unexposed regions of the material diffuses to the exposed regions. The polymerization and resulting diffusion create a refractive index change, thus forming the hologram representing the data. An important aspect to these systems is the mass transport from one region to another to create a large change in refractive index, which may provide a distinct advantage over photochromic systems.

The characteristics and capabilities of the holographic storage medium may depend upon or be affected by a number of factors, and especially the nature, properties, composition, etc., of the holographic medium. For example, the optical and chemical characteristics of a holographic medium may affect how the medium absorbs different wavelengths of light, the speed with which a particular wavelength of light is absorbed, how well or uniformly the medium records the holograms with respect to the particular wavelength of light, etc. In addition, the recording characteristics of the holographic medium may change as the various chemical components present in the medium are used up or formed, as the medium ages over time, etc. All of these factors may affect and may make less optimal the characteristics and capabilities of the holographic medium to record and/or read data.

Designing molecules for index contrast applications such holographic storage medium, holographic optical elements, waveguides and photolithography have previously concentrated on the use of photoactive monomers comprising a single high index—contrasting group attached to a reactive vinyl group (such as an acrylate) or epoxide. Such monomers are described in, for example, U.S. Pat. No. 5,759,721 (Dhal, et al.), issued Jun. 2, 1998; U.S. Pat. No. 5,874,187 (Colvin, et al.), issued Feb. 23, 1999; U.S. Pat. No. 6,103,454 (Dhar, et al.), issued Aug. 15, 2000; U.S. Pat. No. 6,482,551 (Dhar, et al.), issued Nov. 19, 2002; and U.S. Pat. No. 6,784,300 (Cetin, et al.), issued Aug. 31, 2004. Such monomers may form photopolymers having a high diffraction efficiency and high dynamic range.

There may, however, be other ways to improve the performance of photoactive monomers that form photopolymers having high diffraction efficiency, high dynamic range, as well as other desirable properties.

SUMMARY

According to a first broad aspect of the present invention, there is provided an article comprising at least one photoactive index-contrasting polymerizable material and a photoinitiator system incorporated into a polymeric matrix, wherein the photoactive polymerizable material is of appropriately high molecular weight and the composition has an optical absorbance between 330 and 490 nm.

According to a second broad aspect of the present invention, the polymeric matrix of the article is formed through a polymerizing reaction between a component containing a isocyanate functional group and a component containing a polyol functional group.

According to a third broad aspect of the present invention, the optical article comprises a free-radical retarder.

According to a fourth broad aspect of the present invention, the optical article comprises a plasticizer.

According to a fifth broad aspect of the present invention, the polymeric matrix of the optical article is promoted through the use of a catalyst.

According to a sixth broad aspect of the present invention, there is provided a method for holographic recording in an optical article by exposing the optical article to blue light and writing a hologram in the optical article, the optical article comprising a multifunctional photoactive monomer and an organic photoinitiator incorporated in a polymer matrix, wherein the optical article has an absorbance less than 0.5 at wavelengths between 400 and 490 nm and has a refractive index contrast adjusted sensitivity of greater than $3 \times 10^{-6}$ $\Delta n/mJ/cm^2$.

According to a seventh broad aspect of the present invention, there is provided a method for manufacturing an optical article by polymerizing a material comprising two components and forming the optical article, the optical article then comprising a multifunctional photoactive monomer and an organic photoinitiator incorporated in the formed polymer matrix, wherein the optical article has an absorbance less than 0.5 at wavelengths between 400 and 490 nm and has a refractive index contrast adjusted sensitivity of greater than $3 \times 10^{-6}$ $\Delta n/mJ/cm^2$.

DETAILED DESCRIPTION

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, the term "light source" refers to any source of electromagnetic radiation of any wavelength. The light source of the present invention may be from one or more lasers, one or more light emitting diodes (LEDs), etc. In some embodiments, the light source may have a wavelength of between about 200 nm and about 1000 nm.

For the purposes of the present invention, the term "photoinitiating light source" refers to a light source that activates a photoinitiator, a photoactive polymerizable material, or any combination thereof. Photointiating light sources may include recording light, etc.

For the purposes of the present invention, the term "spatial light intensity" refers to a light intensity distribution or pattern of varying light intensity within a given volume of space.

For the purposes of the present invention, the terms "holographic grating," "holograph" or "hologram" (collectively and interchangeably referred to hereafter as "hologram") are used in the conventional sense of referring to an interference pattern formed when a signal beam and a reference beam interfere with each other. In cases wherein data is recorded page-wise, the signal beam may be encoded with a data modulator, e.g., a spatial light modulator, to provide a data beam.

For the purposes of the present invention, the term "holographic recording" refers to a hologram after it is recorded in the holographic medium. The holographic recording may provide bit-wise storage (i.e., recording of one bit of data), may provide storage of a 1-dimensional linear array of data (i.e., a 1×N array, where N is the number linear data bits), or may provide 2-dimensional storage of a page of data. Holographic recording may be performed in a holographic storage medium with recording light.

For the purposes of the present invention, the term "holographic storage medium" refers to a component, material, etc., that is capable of recording and storing, in three dimensions (i.e., the X, Y and Z dimensions), one or more holograms (e.g., bit-wise, linear array-wise or page-wise) as one or more patterns of varying refractive index imprinted into the medium. The holographic storage medium (which may also be referred to interchangeably as a "holographic recording medium" or a "photoimageable system") at least comprises a support matrix in which is dispersed at least one photoactive polymerizable material.

For the purposes of the present invention, the terms "dynamic range" or "M#" relate to an intrinsic property of a holographic medium and refer to the total response of that medium when portioned among the one or more holograms recorded in a common volume and related to the index change and thickness of that medium. See Shelby, "Media Requirements for Digital Holographic Data Storage," *Holographic Data Storage*, Section 1.3 (Coufal, Psaltis, Sincerbox Eds. 2003).

For the purposes of the present invention, the term "diffraction efficiency" of a recorded hologram refers to the fraction of light refracted into a reconstructed object or reference beam by the recorded hologram when illuminated with a beam of light at the same or similar position, angle, wavelength, etc., to the object or reference beam used to record that hologram.

For the purposes of the present invention, the term "percentage of dynamic range used" refers to how much of the dynamic range of a holographic medium has been used, relative to the total dynamic range capacity of the medium. For example, assuming all multiplexed holograms overlapping in a given volume have an equal diffraction efficiency, M# and the diffraction efficiency (DE) may be related by the following equation: $DE=(M\#/n)^2$, wherein n is the number of holograms multiplexed in that volume.

For the purposes of the present invention, the term "holographic data" refers to data stored in the holographic medium as one or more holograms.

For the purposes of the present invention, the term "data page" or "page" refers to the conventional meaning of data page as used with respect to holography. For example, a data page may be a page of data, one or more pictures, etc., to be recorded or recorded in a holographic medium. Data may also include images (e.g., display holograms).

For the purposes of the present invention, the term "recording light" refers to a light source used to record information, data, etc., into a holographic medium.

For the purposes of the present invention, the term "recording data" refers to writing or storing holographic data in a holographic medium.

For the purposes of the present invention, the term "reading data" refers to retrieving, recovering, or reconstructing holographic data stored in a holographic medium.

For the purposes of the present invention, the term "substrate" refers to components, materials, etc., such as, for example, glass plates or plastic plates, which are associated with the holographic medium, and which may provide a supporting structure for the holographic medium. Substrates may also optionally provide other beneficial properties for the article, e.g., rendering the holographic medium optically flat, providing a barrier to water vapor, providing a surface for antireflective coatings, etc.

For the purposes of the present invention, the term "support matrix" refers to a polymeric material, medium, substance, etc., which provides both an index contrast in recording and which also retains the recorded structures (archival stability). The support matrix may be a thermoplastic or a thermoset material. The support matrix may be formed separately and by different chemistries from the photoactive polymerizable material used to record holograms (e.g., two-component systems), as described in commonly-assigned U.S. Pat. No. 6,482,551 (Dhar et al.), issued Nov. 19, 2002, the entire disclosure and contents of which is hereby incorporated by reference. The support matrix also contains substantially few to zero index-contrasting groups contained in the photoactive polymerizable material. The support matrix may be designed to allow the photoactive polymerizable material to diffuse through and to be miscible with/dispersible within the support matrix such that very little light scatter occurs (e.g., either before or after photopolymerization of the photoactive polymerizable material).

For the purposes of the present invention, the term "oligomer" refers to a polymer or polymerizable material having approximately 30 repeat units or less or any large molecule able to diffuse at least about 100 nm in approximately 2 minutes at room temperature when dissolved in a holographic medium of the present invention. When more than one polymerizable group is present on the oligomer, they may be the same or different. Additionally, oligomers may be dendritic. With reference to photopolymers, such oligomers may be the product or products of polymerization of monomers with about 30 or less repeating units, and may comprise residual unreacted functional groups and may be crosslinked. To avoid affecting archival stability of the photopolymer because of potential diffusion through or from the support matrix, photopolymer oligomers may be mechanically or covalently bonded to the support matrix.

For the purposes of the present invention, the term "photopolymerization" refers to any polymerization reaction caused by exposure to a photoinitiating light source.

For the purposes of the present invention, the term "free radical polymerization" refers to any polymerization reaction that is initiated by any molecule comprising a free radical or radicals.

For the purposes of the present invention, the term "cationic polymerization" refers to any polymerization reaction that is initiated by any molecule comprising a cationic moiety or moieties.

For the purposes of the present invention, the term "anionic polymerization" refers to any polymerization reaction that is initiated by any molecule comprising an anionic moiety or moieties.

For the purpose of the present invention, the term "photoinitiator" refers to the conventional meaning of the term photoinitiator and also refers to sensitizers and dyes. In general, a photoinitiator causes the light initiated polymerization of a material, such as a photoactive polymerizable material, when the photoinitiator is exposed to light of a wavelength that activates the photoinitiator, i.e., a photoinitiating light source. The photoinitiator may refer to a combination of components, some of which individually are not light sensitive, yet in combination are capable of initiating polymerization of a polymerizable material (e.g., a photoactive polymerizable material), examples of which may include a dye/amine, a sensitizer/iodonium salt, a dye/borate salt, etc. The term photoinitiator may also refer to a single photoinitiator or to a combination of two or more photoinitiators. For example, two or more photoinitiators may be used to allow recording at two or more different wavelengths of light.

For the purposes of the present invention, the term "photoactive polymerizable material" refers to a photoactive monomer, a photoactive oligomer or combinations thereof that polymerize when exposed to a photoinitiating light source, e.g., recording light, either in the presence or absence of a photoinitiator that has been activated by the photoinitiating light source. In reference to the reactive functional group that undergoes polymerization, the photoactive polymerizable material comprises at least one such reactive functional group. The photoactive polymerizable material also comprises at least one index-contrasting group. It is also understood that there exist photoactive polymerizable materials that may also comprise photoinitiators, such as, for example, N-methylmaleimide, acrylate derivatized acetophenones, etc. In such a case, it is understood that the photoactive polymerizable material may also be a photoinitiator.

For the purposes of the present invention, the term "photopolymer" refers to a polymer formed or resulting from the polymerization of one or more photoactive polymerizable materials, and possibly one or more additional monomers and/or oligomers.

For the purposes of the present invention, the term "room temperature" refers to the commonly accepted meaning of room temperature, i.e., an ambient temperature of 20°-25° C.

For the purposes of the present invention, the term "thermoset" refers to the conventional meaning of thermoset, i.e., a composition, compound, material, medium, substance, etc., that is crosslinked such that it does not have a melting temperature, and cannot be dissolved in a solvent, but which may be swelled by a solvent. Examples of thermoset materials may include crosslinked poly(urethanes), crosslinked poly(acrylates), crosslinked poly(styrene), etc.

For the purposes of the present invention, the term "X-Y plane" typically refers to the plane defined by the substrates or the holographic medium that encompasses the X and Y linear directions or dimensions. The X and Y linear directions or dimensions are typically referred to herein, respectively, as the dimensions known as length (i.e., the X-dimension) and width (i.e., the Y-dimension).

For the purposes of the present invention, the terms "Z-direction" and "Z-dimension" refer interchangeably to the linear dimension or direction perpendicular to the X-Y plane, and is typically referred to herein as the linear dimension known as thickness.

For the purposes of the present invention, the term "index" refers interchangeably to the index of refraction or refractive index.

For the purposes of the present invention, the term "refractive index contrast ($\Delta n$)" is as conventionally known, and is defined as the amplitude of the sinusoidal variations in the refractive index of a material in which a plane-wave, volume hologram has been written. The refractive index may vary as: $n(x) = n_0 + \Delta n \cos(K_x)$, wherein $n(x)$ is the spatially varying refractive index, x is the position vector, K is the grating wave vector, and $n_0$ is the baseline refractive index of the medium.

See, e.g., P. Hariharan, Optical Holography: Principles, Techniques and Applications, Cambridge University Press, Cambridge, 1991, pg. 44, the entire disclosure and contents of which is hereby incorporated by reference. The $\Delta n$ of a material may be calculated from the diffraction efficiency or efficiencies of a single volume hologram or a multiplexed set of volume holograms recorded in a medium.

For the purposes of the present invention, the term "index contrast" refers to the ability of a material to create spatially distinct volumes of higher or lower indices of refraction. For example, in a higher index-contrasting monomer polymerized in a lower index-contrasting support matrix by using an interference pattern generated by crossed laser light, the pattern of the polymerized monomer mimics this interference pattern and thus creates volumes of material that have a higher refractive index (where light intensity is higher) and volumes of material that have a lower refractive index (where light intensity is lower or zero). Any refractive index contrast may allow one to control the direction that light travels by refraction or diffraction. In embodiments of the present invention, the average index contrast between the photoactive polymerizable material and the support matrix may be greater than about 0.1, for example, greater than about 0.2, more typically, greater than about 0.3. The average index contrast may be measured by direct measurement of the refractive index, molar refractive index calculations, solution refractive index methods, holographic measurement of $\Delta n$ (most typically), etc., well known to those skilled in the art.

For the purposes of the present invention, the term "index-contrasting group" refers to those parts of the photoactive polymerizable material which may lend themselves to creating a refractive index contrast between the support matrix and the photoactive polymerizable material after exposure to a photoinitiating light source to, for example, record holograms. This refractive index contrast may be created by having the index-contrasting groups provide either higher or lower (often higher) refractive index contrast between the photopolymer resulting from the photoactive polymerizable material and the support matrix. Index-contrasting groups having a higher refractive index may be comprised of polarizable atoms and groups of atoms. For example, suitable index-contrasting groups may include one or more of bromine, chlorine, sulfur, phosphorous, benzene rings, naphthalene rings, trityl groups, biphenyls, conjugated enes or ketones, etc. For embodiments of the present invention, the index-contrasting group may often refer to the collection of index-contrasting groups that provide the majority of the index contrast for the photoactive polymerizable material. For example, a brominated benzene ring attached to a benzophenone moiety may be attached to a linker moiety and then to an acrylate moiety would contain one index-contrasting group comprising both the brominated benzene and the benzophenone group. In certain embodiments, the geometry for the index-contrasting group is such that the individual components comprising the index-contrasting group are centrally located with linking moieties or reactive groups extending away from the index-contrasting group.

For the purposes of the present invention, the terms "index-contrasting structures" or "refractive index structures" or "index structures" or "index regions" refer collectively to those volumes in a material that have a different refractive index compared to other volumes in a material.

For the purposes of the present invention, the term "reactive functional group" refers to a functional group responsible for polymerization of the photoactive polymerizable material. For example, suitable reactive functional groups may include the following: ethylenic unsaturation (i.e., one or more double bonds, such as acrylates, methacrylates, acrylamides, methacrylamides, styrenes, substituted styrenes such as methyl styrene, etc., vinyl naphthalenes, substituted vinyl naphthalenes, other vinyl polyaromatics, vinylcyclohexene, vinylcyclohexene dioxide, vinylcyclohexene monoxide, vinyl esters, vinyl ethers, vinyl carbazoles, other vinyl derivatives, cycloalkenes, cyclic ethers (e.g., epoxide, glycidyl ether, allyl glycidyl ether, etc.), cyclic carbonates, cyclic esters, dioxalanes, etc.

For the purposes of the present invention, the term "primary reactive group" refers to a primary group, as distinct from secondary or tertiary group, as this term is conventionally used in chemistry. For example, butyl acrylate is a primary acrylate, and butyl methacrylate is a primary methacrylate, but butyl methacrylate is a secondary alkene, while butyl acrylate may be referred to as a primary alkene.

For the purposes of the present invention, the term "reactive site" refers to a functional group on the photoactive polymerizable material that causes radical generation either by chain transfer or by photocleavage due to the recording light (i.e., basically a photoinitiator attached to the photoactive polymerizable material or a photoactive polymerizable material that has photoinitiating functionality). The reactive site may also be a chain transfer site for anionic or cationic reactions as well.

For the purposes of the present invention, the term "chain length" refers to the kinetic chain length, or the average degree of polymerization.

For the purposes of the present invention, the term "Kramers-Kronig relationship" refers to mathematical properties which connect the real and imaginary parts of any complex function analytic in the upper half plane. For embodiments of the present invention, the Kramers-Kronig relation may be used to describe the increase in refractive index as an absorption band is approached.

For the purposes of the present invention, the term "sensitivity" refers to the energy required to generate a measured amount of index contrast.

For the purposes of the present invention, the term "covalently crosslinked" refers to the conventional meaning and use of this term, wherein one or more linear polymer chains are covalently bonded to other linear polymer chains to form a 3-dimensional network.

For the purposes of the present invention, the term "shrinkage" refers to a decrease in volume that normally accompanies the transition from polymerizable material to polymer. Not all polymerizable materials produce shrinkage. For many embodiments, shrinkage may be less than about 5 volume %, for example, less than about 1 volume %, and more typically between 0 and about 0.1 volume %. Conversely, expansion may also occur in some embodiments (e.g., as may happen with some ring opening polymerizations).

For the purposes of the present invention, the term "chain transfer" refers to interrupting the growth of a kinetic chain by formation of a new radical that may react as a new nucleus for forming a new polymeric molecular chain. Chain transfer may cause the formation of a higher proportion of shorter polymer chains, relative to polymerization reactions that occur without chain transfer. Chain transfer may also occur with cationic and anionic polymerizations.

For the purposes of the present invention, the term "optical article" refers to an article comprising a holographic medium and other optional structures, components, elements, materials, etc., such as, for example, substrates, antireflective and/or scratch resistant coatings, labeling, cartridges, hubs, etc.

Examples of optical articles may include recording media, waveguides, beam or optical filters, beam steerers or deflectors, optical couplers, etc.

DESCRIPTION

A. Recording Medium, Articles and Recording Holograms

Embodiments of the holographic storage media of the present invention may be formed such that holographic writing to and reading from the medium are possible. Fabrication of the holographic storage medium may involve depositing a combination, blend, mixture, etc., of the support matrix, photoactive polymerizable material, photoinitiator, etc., on a support structure, such as a substrate, or more typically positioned between a pair of (i.e., two) substrates, and using, for example, a gasket to contain the mixture. Spacers may also be used between the substrates to maintain a desired thickness for the recording medium. In applications requiring optical flatness, the liquid mixture may shrink during cooling (if a thermoplastic) or curing (if a thermoset) and thus distort the optical flatness of the article. To reduce such effects, it may be useful to place the holographic storage medium between substrates in an apparatus containing mounts, e.g., vacuum chucks, capable of being adjusted in response to changes in parallelism and/or spacing. In such an apparatus, it may be possible to monitor the parallelism in real-time by use of conventional interferometric methods, and to make any necessary adjustments to the heating/cooling process. During formation, the holographic storage medium may be supported in other ways other than by use of a substrate or substrates. More conventional polymer processing is also envisioned, e.g., closed mold formation, sheet extrusion, etc. A stratified article is also contemplated, i.e., a plurality of holographic storage medium layers disposed between respective substrates.

Embodiments of the holographic recording media of the present invention that are formed may be capable of being used in a holographic storage system, for example, the one shown in FIG. 1 and described in commonly assigned U.S. Pat. No. 6,482,551 (Dhar, et al.), issued Nov. 19, 2002, the entire disclosure and contents of which is hereby incorporated by references. The amount of information capable of being stored in a holographic storage medium is proportional to the product of: the refractive index contrast, $\Delta n$, of the photorecording material, the thickness, d, of the photorecording material, etc. The $\Delta n$ is associated with a medium before writing, but may be observed by a measurement performed after recording. Advantageously, embodiments of the holographic storage media of the present invention exhibit a $\Delta n$ of about $3 \times 10^{-3}$ or higher.

In addition to holographic storage media, examples of embodiments of other optical articles of the present invention may include beam or optical filters, beam steerers or deflectors, optical couplers, etc. (See, e.g., L. Solymar et al., *Volume Holography and Volume Gratings*, (Academic Press 1981), pp.: 315-27), the entire contents and disclosure of which is hereby incorporated by reference.) A beam filter separates part of an incident laser beam that is traveling along a particular angle from the rest of the beam. Specifically, the Bragg selectivity of a thick transmission hologram is able to selectively diffract light along a particular angle of incidence, while light along other angles travels undeflected through the hologram. (See, e.g., J. E. Ludman et al., "Very thick holographic nonspatial filtering of laser beams," *Optical Engineering*, 36, (6), (1997), pp.: 1700 et seq., the entire contents and disclosure of which is hereby incorporated by reference.) A beam steerer is a hologram that deflects light incident at the Bragg angle. An optical coupler may be a combination of beam deflectors that steer light from a source to a target. These articles, which may also be referred to as holographic optical elements, may be fabricated by imaging a particular optical interference pattern within a recording medium, as discussed herein. Media for these holographic optical elements may be formed by the techniques discussed herein for recording media or waveguides.

The material principles discussed herein are applicable not only to hologram formation, but also to formation of optical transmission devices such as waveguides. Polymeric optical waveguides are discussed for example in B. Booth, "Optical Interconnection Polymers," in *Polymers for Lightwave and Integrated Optics, Technology and Applications*, (L. A. Hornak, ed., Marcel Dekker, Inc. 1992); U.S. Pat. No. 5,292,620 (Booth et al.), issued Mar. 18, 1994; and U.S. Pat. No. 5,219,710 (Horn et al.), issued Jun. 15, 1993, the disclosures of which are hereby incorporated by reference. Essentially, the recording material may be irradiated in a desired waveguide pattern to provide refractive index contrast between the waveguide pattern and the surrounding (cladding) material. It may also be possible for exposure to be performed, for example, by a focused laser light, by use of a mask with a non-focused light source, etc. Generally, a single layer may be exposed in this manner to provide the waveguide pattern, and additional layers may be added to complete the cladding, thereby completing the waveguide. This process is discussed for example at pages 235-36 of Booth, supra, and Cols. 5 and 6 of U.S. Pat. No. 5,292,620, supra, the entire contents and disclosure of which is hereby incorporated by reference.

In one embodiment of a holographic storage medium, conventional molding techniques may be used to mold the combination, blend, mixture, etc., of the support matrix, photoactive polymerizable material, photoinitiator, etc., into a variety of shapes prior to formation of the article by cooling to room temperature. For example, the combination, blend, mixture, etc., of the support matrix, photoactive polymerizable material, photoinitiator, etc., may be molded into ridge waveguides, wherein a plurality of refractive index patterns may then be written into the molded structures. It may thereby be possible to easily form structures such as Bragg gratings. This feature may increase the breadth of applications in which such polymeric waveguides would be useful.

In another embodiment of a holographic storage medium, the support matrix may be thermoplastic and allow the holographic storage medium to behave as if it is entirely a thermoplastic. That is, the support matrix allows the holographic storage medium to be processed similar to the way that a thermoplastic is processed, i.e., molded into a shaped form, blown into a film, deposited in liquid form on a substrate or between a pair of substrates, extruded, rolled, pressed, made into a sheet of material, etc., and then allowed to harden at room temperature to take on a stable shape or form. The support matrix may comprise one or more thermoplastics. Suitable thermoplastics may include poly(vinyl acetate), poly (styrene), poly(ethylene), poly(propylene), poly(ethylene oxide), linear nylons, linear polyesters, linear polycarbonates, linear polyurethanes, poly(vinyl chloride), poly(vinyl alcohol-co-vinyl acetate), etc.

In another embodiment, the amount of thermoplastic used in the holographic storage medium may be enough that the entire holographic storage medium effectively acts as a thermoplastic for most processing purposes. The support matrix of the holographic storage medium may make up as much as about 5%, preferably as much as about 50%, and more preferably as much as about 90% of the holographic storage medium by volume. The amount of any given support matrix in the holographic storage medium may vary based on clarity, refractive index, melting temperature, $T_g$, color, birefringence, solubility, etc. of the thermoplastic or thermoplastics that make up the binder component. Additionally, the amount of the support matrix in the holographic storage medium may vary based on the article's final form, whether it is a solid, a flexible film, or an adhesive.

Similarly, in another embodiment of the holographic storage medium wherein a thermoset is formed, the support matrix may contain functional groups that copolymerize or otherwise covalently bond with the photoactive polymerizable material used to form the photopolymer. Such support matrix attachment methods may allow for increased archival life of the recorded holograms. Suitable thermoset systems for used herein are disclosed in to U.S. Pat. No. 6,482,551 (Dhar et al.), issued Nov. 19, 2002, the entire disclosure and contents of which is hereby incorporated herein by reference.

In another embodiment of the holographic storage medium, the thermoplastic support matrix may be crosslinked noncovalently with the polymer formed upon hologram formation by using a functionalized thermoplastic polymer in the support matrix. Examples of such non-covalent bonding include ionic bonding, hydrogen bonding, dipole-dipole bonding, aromatic pi stacking, etc.

In another embodiment, the holographic storage medium may comprise at least one photoactive polymerizable material that can form holograms in the resulting photopolymer when exposed to a photoinitiating light source, such as a laser beam that is recording data pages to the holographic storage medium. The photoactive polymerizable materials may include any photoactive monomer, photoactive oligomer, or combination thereof, having the parameters as further described below, that is capable of undergoing photoinitiated polymerization, and which, in combination with the support matrix, meets the compatibility requirements of the present invention. Suitable photoactive polymerizable materials may include those which polymerize by a free-radical reaction, e.g., molecules containing ethylenic unsaturation (i.e., one or more double bonds), such as acrylates, methacrylates, acrylamides, methacrylamides, styrenes, substituted styrenes, such as methyl styrene, etc., vinyl naphthalenes, substituted vinyl naphthalenes, other vinyl polyaromatics, vinylcyclohexene, vinylcyclohexene dioxide, vinylcyclohexene monoxide, vinyl esters, vinyl ethers, vinyl carbazoles, other vinyl derivatives, cycloalkenes, cyclic ethers (e.g., epoxide, glycidyl ether, allyl glycidyl ether, etc.), cyclic carbonates, cyclic esters, dioxalanes, etc. Free-radical copolymerizable pair systems such as vinyl ether/maleimide, vinyl ether/thiol, acrylate/thiol, vinyl ether/hydroxy, etc., may also be suitable. It may also be possible to use cationically polymerizable systems; a few examples of which include vinyl ethers, alkenyl ethers, allene ethers, ketene acetals, epoxides, etc. Furthermore, anionic polymerizable systems may also be suitable herein. It may also be possible for a single photoactive polymerizable molecule to contain more than one polymerizable functional group. Other suitable photoactive polymerizable materials may also include cyclic disulfides and cyclic esters. Photoactive oligomers that may be included in the photoactive polymerizable materials to form a holographic grating upon exposure to a photoinitiating light source include oligomers such as oligomeric (ethylene sulfide) dithiol, oligomeric (phenylene sulfide) dithiol, oligomeric (bisphenol A), oligomeric (bisphenol A) diacrylate, oligomeric polyethylene with pendent vinyl ether groups, etc. The photoactive polymerizable material of the holographic storage medium may be mono functional, difunctional, and/or multifunctional.

In addition to the at least one photoactive polymerizable material, the article comprising the holographic storage medium may contain a photoinitiator. The photoinitiator, upon exposure to relatively low levels of the recording light, chemically initiates the polymerization of the photoactive polymerizable material, thus avoiding the need for direct light-induced polymerization. The photoinitiator generally should offer a source of species that initiate polymerization of the particular photoactive polymerizable material, e.g., photoactive monomer. Typically, from about 0.1 to about 20 vol. % photoinitiator provides desirable results.

A variety of photoinitiators known to those skilled in the art and available commercially are suitable for use in the holographic storage medium. It may be advantageous to use a photoinitiator that is sensitive to light at wavelengths available from conventional laser sources, e.g., the blue and green lines of $Ar^+$ (458, 488, 514 nm) and He—Cd lasers (442 nm), the green line of frequency doubled YAG lasers (532 nm), and the red lines of He—Ne (633 nm), $Kr^+$ lasers (647 and 676 nm), and various diode lasers (290 to 900 nm). One advantageous free radical photoinitiator is bis($\eta$-5-2,4-cyclopentadien-1-yl)bis[2,6-difluoro-3-(1H-pyrrol-1-yl)phenyl]titanium, available commercially from Ciba as Irgacure 784™. Another visible free-radical photoinitiator (which requires a co-initiator) is 5,7-diiodo-3-butoxy-6-fluorone, commercially available from Spectra Group Limited as H-Nu 470. Free-radical photoinitiators of dye-hydrogen donor systems are also possible. Examples of suitable dyes include eosin, rose bengal, erythrosine, and methylene blue, and suitable hydrogen donors include tertiary amines such as n-methyl diethanol amine. For blue wavelengths, any of the photoinitiators described in U.S. Pat. No. 6,780,546 (Trentler et al.), issued Aug. 24, 2004, the entire disclosure and contents of which is hereby incorporated by reference, may be useful. In the case of cationically polymerizable materials, a cationic photoinitiator may be used, such as a sulfonium salt or an iodonium salt. These cationic photoinitiator salts absorb predominantly in the UV portion of the spectrum, and are therefore typically sensitized with a sensitizer or dye to allow use of the visible portion of the spectrum. An example of an alternative visible cationic photoinitiator is ($\eta_5$-2,4-cyclopentadien-1-yl) ($\eta_6$-isopropylbenzene)-iron(II) hexafluorophosphate, available commercially from Ciba as Irgacure 261.

In many embodiments of the holographic storage medium, the photoinitiators used are sensitive to ultraviolet and visible radiation of from about 200 nm to about 1000 nm.

The holographic storage medium may also include additives such as plasticizers for altering the properties thereof including the melting point, flexibility, toughness, diffusibility of the monomers, ease of processibililty, etc. Examples of suitable plasticizers include dibutyl phthalate, poly(ethylene oxide) methyl ether, N,N-dimethylformamide, etc. Plasticizers differ from solvents in that solvents are typically evaporated whereas plasticizers are meant to remain in the holographic storage medium.

Other types of additives that may be used in the liquid mixture of the holographic storage medium are inert diffusing agents having relatively high or low refractive indices. Inert diffusing agents typically diffuse away from the hologram being formed, and can be of high or low refractive index but are typically low. Thus, when the photoactive polymerizable material is of high refractive index, the inert diffusing agent would be of low refractive index, and ideally the inert diffusing agent diffuses to the nulls in an interference pattern. Overall, the contrast of the hologram may be increased. Other additives that may be used in the mixture comprising the holographic storage medium include: pigments, fillers, non-photoinitiating dyes, antioxidants, bleaching agents, mold releasing agents, antifoaming agents, infrared/microwave absorbers, surfactants, adhesion promoters, etc.

In one embodiment of the holographic storage medium, the photoactive polymerizable material comprises less than about 20 volume %. In other embodiments, the photoactive polymerizable material of the holographic storage medium may be less than about 10 volume %, or even less than about 5 volume %. For data storage applications, the photoactive polymerizable material is typically present at about 5 volume %. Factors affecting the amount of polymerizable content needed are generally the desired index contrast and effects from shrinkage of the photoactive polymerizable material upon recording (if it occurs), and so may be selected based on the particular application.

In one embodiment, the holographic storage medium may be used to store volatile holograms. Due to the ability to control the photopolymer chain length in the holographic storage medium, a particular mixture may be tuned to have a very general lifetime for the recorded holograms. Thus, after hologram recording, the holograms may be readable for a defined time period such as a week, a few months, years, etc. Heating the holographic storage medium may also increase such a process of hologram destruction. Examples of applications for using volatile holograms may include: rental movies, security information, tickets (or season passes), thermal history detector, time stamp, temporary personal records, etc.

In one embodiment, the holographic storage medium may be used to record permanent holograms. There are several methods to increase the permanency of recorded holograms. Many of these methods involve placing functional groups on the support matrix that allow for the attachment of the resulting photopolymer to the support matrix during cure. The attachment groups may be vinyl unsaturations, chain transfer sites, or even a polymerization retarder such as a hindered phenol derivative. Otherwise, for increased archival stability of recorded holograms, a multifunctional photoactive polymerizable material may be used which allows for crosslinking of the photopolymer, thus increasing the entanglement of the photopolymer in the support matrix. In one embodiment of holographic storage medium, both a multifunctional photoactive polymerizable material and a support matrix-attached chain transfer agent are used. In this way, the shorter chains that are caused by the polymerization retarder or chain transfer agent do not cause loss of archival life.

An optical article of the present invention may be of any thickness needed. For example the article may be thin for display holography or thick for data storage. For data storage applications, the article may be, for example, from about 1 to about 1.5 mm in thickness, and may be in the form of a film or sheet of holographic storage medium between two substrates with at least one of the substrates having an antireflective coating and may be sealed against moisture and air. An article of the present invention may also be made optically flat via the appropriate processes, such as the process described in U.S. Pat. No. 5,932,045 (Campbell et al.), issued Aug. 3, 1999, the entire disclosure and contents of which is hereby incorporated by reference.

An optical article of the present invention may be used for decorative purposes. For example, the article may be used in gift wrap or in window treatments to provide special artistic tinting or 3D designs. The article may be used in molded parts of automobiles, toys, furniture, appliances, etc. to provide decorative effects. An article of the present invention may also be used to make data storage devices of various sizes and shapes, as a block of material or as part of a coating that is coated on a substrate.

Embodiments of the holographic storage media and articles of the present invention may be used in various methods for recording one or more holograms (i.e., at least one hologram), including any method known to those skilled in the art for recording holograms in other holographic storage media. An embodiment of a method for recording at least one hologram may comprise the following steps: (a) providing an article comprising the holographic storage medium (with or without a photoinitiator for the photoactive polymerizable material); and (b) exposing the article to a photoinitiating light source (e.g., recording light) to cause the photoactive polymerizable material (e.g., by activating any photoinitiator present in the article) to form a photopolymer to thereby record at least one hologram in the holographic medium. Embodiments of methods of the present invention for recording holograms may include, for example, multiplexing holograms (e.g., polytopic, angular, phase shift, varying wavelength, varying phase code, phase correlation, etc.), as well as other techniques for recording of holograms in holographic media known to those skilled in the art. Some suitable methods for recording holograms, including multiplexing techniques, are disclosed in, for example, U.S. Pat. No. 5,703,705 (Curtis et al.), issued Dec. 30, 1997; U.S. Pat. No. 5,719,691 (Curtis et al.), issued Feb. 17, 1998; U.S. Pat. No. 5,892,601 (Curtis et al.), issued Apr. 6, 1999; U.S. Pat. No. 5,943,145 (Curtis et al.), issued Aug. 24, 1999; U.S. Pat. No. 6,191,875 (Curtis et al.), issued Feb. 20, 2001; U.S. Pat. No. 6,614,566 (Curtis et al.), issued Sep. 2, 2003; commonly assigned U.S. Pat. No. 6,697,180 to Wilson et al.), issued Feb. 24, 2004; U.S. Pat. No. 6,798,547 (Wilson et al.), issued Sep. 28, 2004; U.S. Pat. No. 6,721,076 (King et al.), issued Apr. 13, 2004; and U.S. Published Patent Application No. 2004-0179251 Anderson, et al.), published Sep. 16, 2004, the entire disclosure and contents of which are hereby incorporated by reference.

B. Photoactive Polymerizable Materials Having Improved Performance

Embodiments of the photoactive polymerizable materials of the present invention may provide improved refractive index contrast when photoactive monomers with molecular weights greater than 500 are present (e.g., dispersed, dissolved, dispersed, embedded, enclosed, etc., in the support matrix). The performance of embodiments of the photoactive polymerizable materials of the present invention in, for example, index contrast applications such as holographic data storage (e.g., hologram recording), holographic optical elements, waveguides, photolithography, etc., may be improved by including one or more of the following parameters: (1) the photoactive monomer is multifunctional; (2) the photoactive group contains an acrylate group; (3) the photoactive multifunctional monomer contains bis-phenol derivatives, and (4) the photoactive multifunctional monomer may be chosen from the following

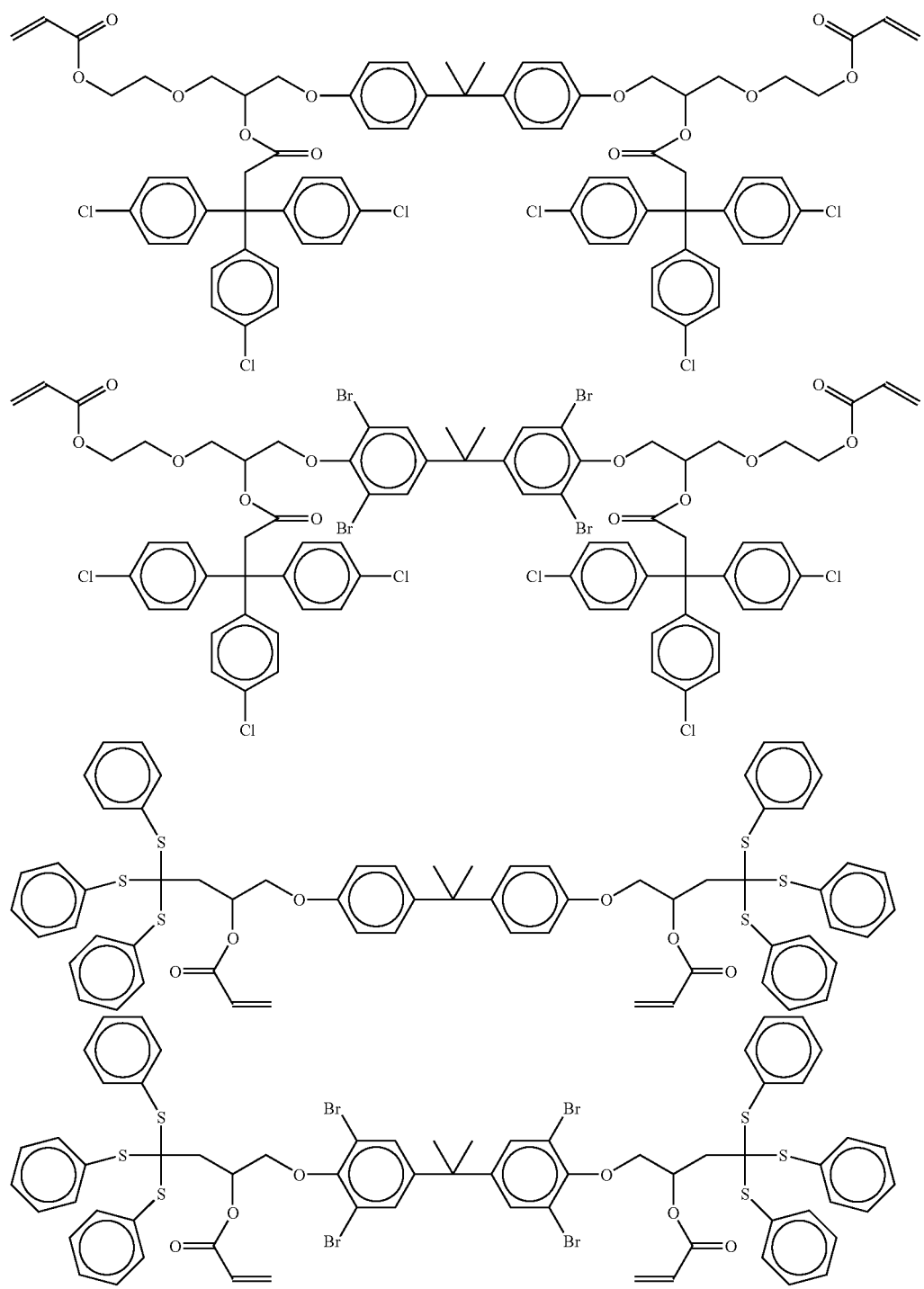

Embodiments of the polymer matrix of the present invention may contain components containing isocyanate, NCO, groups and components containing polyol, OH, groups. These components can provide compatibility with the photoactive monomers and speed and ease in manufacturing of the optical article. The performance of embodiments of the photoactive polymerizable materials of the present invention in, for example, index contrast applications such as holographic data storage (e.g., hologram recording), holographic optical elements, waveguides, photolithography, etc., may be improved by maintaining the equivalent ratio of the hydroxyl functionality of the polyol component to the isocyanate functionality of the NCO component is 0.5 to 1.5.

Embodiments of the photoinitiator of the present invention may contain photoinitiators comprising an acylphosphine oxide or an oxime ester or combinations thereof. The performance of embodiments of the photoactive polymerizable materials of the present invention in, for example, index contrast applications such as holographic data storage (e.g., hologram recording), holographic optical elements, waveguides, photolithography, etc., may be improved wherein the organic photoinitiator is selected from the group consisting of

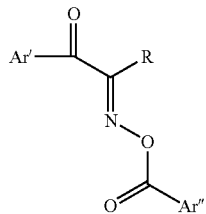
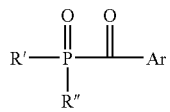

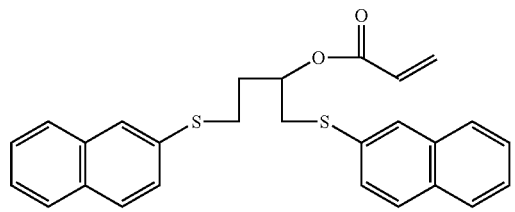

and combinations thereof.

Embodiments of the polymer matrix of the present invention may contain free radical retarders and/or plasticizers to improve performance.

EXAMPLES

Example 1

The holographic performances of two different formulations—one with a relatively low molecular weight monomer and the other with a high molecular weight monomer—are compared. The weight percents of the photoactive monomers are adjusted so that comparable number of moles of the monomer used.

TABLE 1

| Component/Parameter | Formulation 1 According to the Invention | Formulation 2-comparative Examples, not according to the invention |
|---|---|---|
| A glycerole propoxylate with an average of Mn 1500 | 65.73 wt % | 61.47 wt % |
| Baytech WE 180 | 30.31 wt % | 28.34 wt % |
| Monomer A | 2.66 wt % | |
| Monomer B | | 8.95 wt % |
| Irgacure OXE01 | 0.30 wt % | 0.30 wt % |
| Dibutyltin Dilaurate-Catalyst | 1.00 wt % | 0.94 wt % |
| M/# per 200 um | 11.27 | 5.3 |
| Refractive index adjusted photosensitivity | $5.3 \times 10^{-6}$ | $2.1 \times 10^{-6}$ |

Monomer A:

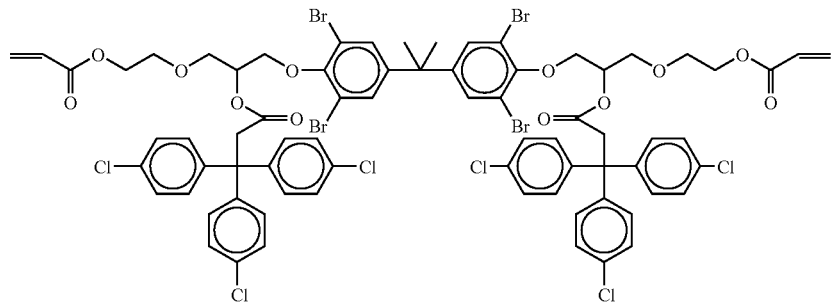

Monomer B:

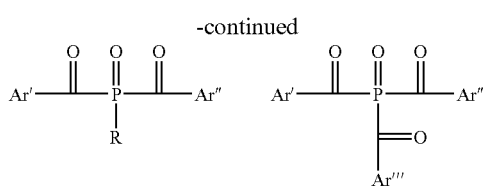

Baytech WE 180 is a Diphenylmethandiisocyanate based Polypropylenoxidepolyether prepolymer with a NCO-Gehalt of 18.6%; available form Bayer MaterialScience LLC, Pittsburgh, PA, USA.
Irgacure OXE01 is a photoinitiator, available from Ciba Speciality Chemicals
The example demonstrates the benefit of using higher molecular weight monomers yielding higher performance in both M/# and photosensitivity.

Example 2

The holographic performance of formulations with varying optical densities are compared. The formulations contained:
Formulation 1:
Varying amounts wt % Darocur TPO
5.00 wt % Monomer A
0.11 wt % Benzhydrol
0.03 wt % Hydroxypropylacrylate
29.4 wt % Desmodur XP2410
25.7 wt % Polycaprolacton (Mw of app. 750)

Darocur TPO is 2,4,6-Trimethyl-benzoyl-diphenylphosphinoxid, available from Ciba Speciality Chemicals.

Desmodur XP2410 is a Hexanediisocyanate-1,6based polyisocyanate with an NCO content of 23.5%, containing a high content of oxadiazinedione structures, available from Bayer MaterialScience AG, Leverkusen, Germany.

FIG. 1 shows the dependence of the M/# on the optical density of the media.

The above example demonstrates the advantages of controlling the absorbance of the media to a value below at least 1.0.

Blockcopolymer 1:

A 1 liter three neck flask was charged with 0.25 g stannous octoate, 172.29 g ☐Čaprolacton and 327.46 g of a difunctional Polytetrahydrofuranpolyetherpolyols (Equivalentweight 325 g/Mol OH) and heated to 120° C. The temperature was kept until the solids contents was above 99.5Gew.-%. After cooling a viscous product was obtained.

Blockcopolymer 2:

A 1 liter three neck flask was charged with 0.18 g stannous octoate, 374.81 g ☐Čaprolacton and 374.81 g of a difunctional Polytetrahydrofuranpolyetherpolyols (Equivalentweight 500 g/Mol OH) and heated to 120° C. The temperature was kept until the solids contents was above 99.5 Gew.-%. After cooling a waxy product was obtained.

Example 3

The holographic performances of four different formulations with differing ratios of the hydroxyl functionality of the polyol component to the isocyanate functionality of the NCO-terminated pre-polymer component. The formulations and performance characteristics of the different recording media are shown in Table 2.

TABLE 2

| Component/Parameter | Formulation 1 | Formulation 2 | Formulation 3 | Formulation 4 |
|---|---|---|---|---|
| Blockcopolymer 2 Desmodur XP2410 | | 10% excess | 20% excess | 30% excess |
| Monomer A | 8 wt % | 8 wt % | 8 wt % | 8 wt % |
| TPO photoinitiator (ppm) | 1500 | 1500 | 1500 | 1500 |
| Benzhydrol (ppm) | 5000 | 5000 | 5000 | 5000 |
| Dibutyltin Dilaurate Catalyst | $4 \times 10^{-3}$ wt % | $4 \times 10^{-3}$ wt % | $4 \times 10^{-3}$ wt % | $4 \times 10^{-3}$ wt % |
| M/# per 200 um | 10.2 | 10.6 | 10.2 | 10.4 |
| Refractive index adjusted photosensitivity | $17.80 \times 10^{-6}$ | $28.30 \times 10^{-6}$ | $32.6 \times 10^{-6}$ | $39.20 \times 10^{-6}$ |

The above example demonstrates the advantages of using an excess amount of the polyol component to improve the photosensitivity of the material. An upper limit on the amount of excess is typically determined to optimize the mechanical robustness of the media.

Example 4

The holographic performance of formulations with and with out plasticizer are compared. The formulations contained:

Formulation 1:
0.15 wt % Darocur TPO
8.00 wt % Monomer A
0.50 wt % Benzhydrol
25.13 wt % Desmodur XP2410
66.19 wt % Blockcopolymer 1
0.05 wt % Fomrez UL 28

Formulation 2:
0.15 wt % Darocur TPO
8.00 wt % Monomer A
0.50 wt % Benzhydrol
22.35 wt % Desmodur XP2410
58.87 wt % Blockcopolymer 1
0.05 wt % Fomrez UL 28
10.0 wt % Dibutylphthalate

| Fomrez UL 28, a urethane catalyst of GE Silicones | | |
|---|---|---|
| | Dynamic Range (M/#/0.2 mm) | Sensitivity (cm²/mJ) |
| Formulation 1 | 10.7 | 4.3E−06 |
| Formulation 2 (with Plasticizer) | 10.8 | 9.2E−06 |

The above example demonstrates the advantages of using a plasticizer material yielding higher photosensitivity media.

What is claimed is:

1. An optical article comprising a photoactive monomer with molecular weight greater than 500 and a photoinitiator incorporated in a polymer matrix, wherein the optical article has an initial absorbance between 330 and 490 nm and wherein the polymer matrix is formed by a polymerizing reaction of a material comprising component 1 and component 2, said component 1 comprises an NCO functional component and said component 2 comprises a polyol and wherein an excess amount of at least about 10% polyol is used.

2. The optical article of claim 1 wherein the optical article has a refractive index contrast greater than $3 \times 10^{-4}$.

3. The optical article of claim 1 wherein the optical article has a refractive index contrast adjusted sensitivity of greater than $1 \times 10^{-6} \Delta n/mJ/cm^2$.

4. The optical article of claim 1, wherein the photoinitiator comprises an acylphosphine oxide or an oxime ester or combinations thereof.

5. The optical article of claim 1, wherein the organic photoinitiator is selected from the group consisting of

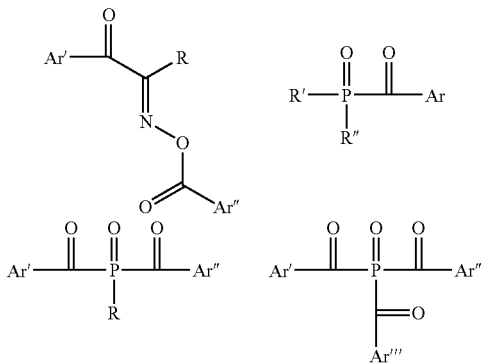

and combinations thereof.

6. The optical article of claim 1, wherein the photoactive monomer is multifunctional.

7. The optical article of claim 6 wherein the photoactive multifunctional monomer comprises an acrylate group.

8. The optical article of claim 1, wherein the optical article is selected from the group consisting of an optical waveguide and a holographic recording medium and combinations thereof.

9. The optical article of claim 1, wherein the optical article has a writing induced shrinkage of less than 0.25 percent.

10. The optical article of claim 1, wherein the photoinitiator is substantially free of a transition metal complex.

11. The optical article of claim 1, wherein a free radical retarder is added.

12. The optical article of claim 11, wherein the free radical retarder is one or more of the following: benzhydrol, triphenylmethane, tris(thiophenyl)methane, diphenylmethane, aniline, hindered phenol, and ether derivatives of benzhydrol.

13. The optical article of claim 1, wherein the formulation further comprises a plasticizer.

14. The optical article of claim 13, wherein the said plasticizer is one or more of the following: dibutyl phthalate, low molecular weight amides with boiling points greater than 100° C., low molecular weight esters with boiling points greater than 100° C., and low molecular weight polyethers.

15. The optical article of claim 1, wherein the polymerizing reaction is promoted by a catalyst.

16. The optical article of claim 15, wherein said catalyst is a Lewis acid catalyst based on metal complexes containing metals such as zinc, manganese, iron, tin, and zirconium.

17. The optical article of claim 1 wherein the article contains two substrates encasing the polymer matrix.

18. The optical article of claim 17 wherein at least one of the substrates contains a surface relief or tracking pattern.

19. The optical article of claim 17 wherein at least one of the substrates is coated with an anti-reflection coating on its outer surface.

20. The optical article of claim 1 wherein the article is housed within a cartridge.

21. A method for holographic recording in an optical article comprising exposing the optical article to blue light and writing a hologram in the optical article, the optical article comprising a multifunctional photoactive monomer with molecular weight greater than 500 and an organic photoinitiator incorporated in a polymer matrix, wherein the optical article has an absorbance less than 0.5 at wavelengths between 400 and 490 nm and has a refractive index contrast adjusted sensitivity of greater than $3\times10^{-6}$ $\Delta n/mJ/cm^2$ and wherein the polymer matrix is formed by a polymerizing reaction of a material comprising component 1 and component 2, said component 1 comprises an NCO functional component and said component 2 comprises a polyol and wherein an excess amount of at least about 10% polyol is used.

22. A method for manufacturing an optical article comprising polymerizing a material comprising component 1 and component 2 and forming the optical article, the optical article comprising a multifunctional photoactive monomer with molecular weight greater than 500 and an organic photoinitiator incorporated in a polymer matrix, wherein the optical article has an absorbance less than 0.5 at wavelengths between 400 and 490 nm and has a refractive index contrast adjusted sensitivity of greater than $3\times10^{-6}$ $\Delta n/mJ/cm^2$ and wherein the polymer matrix is formed by a polymerizing reaction of a material comprising component 1 and component 2, said component 1 comprises an NCO functional component and said component 2 comprises a polyol and wherein an excess amount of at least about 10% polyol is used.

* * * * *